US012400168B2

(12) United States Patent
Kumar et al.

(10) Patent No.: US 12,400,168 B2
(45) Date of Patent: Aug. 26, 2025

(54) SYSTEMS AND METHOD FOR DETERMINING HYGIENE IN ENTERPRISE DOCUMENTS WITH RESPECT TO REGULATORY OBLIGATIONS

(71) Applicant: Tata Consultancy Services Limited, Mumbai (IN)

(72) Inventors: Rahul Kumar, Pune (IN); Jaya Dutta, Pune (IN); Manu Goel, Pune (IN); Sagar Sunkle, Pune (IN); Vinay Kulkarni, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 243 days.

(21) Appl. No.: 18/209,670

(22) Filed: Jun. 14, 2023

(65) Prior Publication Data

US 2023/0410018 A1 Dec. 21, 2023

(30) Foreign Application Priority Data

Jun. 15, 2022 (IN) .............................. 202221034374

(51) Int. Cl.
*G06F 16/36* (2019.01)
*G06F 16/3329* (2025.01)
*G06Q 10/0637* (2023.01)

(52) U.S. Cl.
CPC ... *G06Q 10/06375* (2013.01); *G06F 16/3329* (2019.01); *G06F 16/367* (2019.01)

(58) Field of Classification Search
None
See application file for complete search history.

(56) References Cited

U.S. PATENT DOCUMENTS 10,922,621 B2 2/2021 Buccapatnam Tirumala et al.
11,556,938 B2 * 1/2023 Nair ...................... G06F 40/284
(Continued)

FOREIGN PATENT DOCUMENTS

CN 109492916 A 3/2019

OTHER PUBLICATIONS

Hashmi M, Governatori G, Lam HP, Wynn MT. Are we done with business process compliance: state of the art and challenges ahead. Knowledge and Information Systems. Oct. 2018;57(1):79-133. (Year: 2018).*

(Continued)

*Primary Examiner* — Olujimi A Adesanya
(74) *Attorney, Agent, or Firm* — Finnegan, Henderson, Farabow, Garrett & Dunner, LLP

(57) ABSTRACT

Enterprises need assurance that their internal documents like policies, procedures, controls, standard operating procedures (SOPS) are adherent to the regulatory obligations. In conventional practice this requires a manual effort where legal, business and IT experts collaborate for assuring completeness and consistency in enterprise documents with respect to regulatory obligations, thereby establishing regulatory hygiene. Governance risk and compliance (GRC) frameworks help experts with collaboration but do not provide automation aids necessary to reduce the analysis and synthesis burden. Present disclosure provides system and method for determining hygiene in the plurality of enterprise documents with respect to the plurality of regulatory obligations by extracting concept ontology models from multiple enterprise documents and multiple regulations and enabling navigation across multiple documents via the ontology. The system further reasons out how this form of navigation or creating a common navigable ontology (Continued)

enables establishing hygiene in enterprise documents with respect to regulatory obligations.

20 Claims, 4 Drawing Sheets

(56) References Cited

U.S. PATENT DOCUMENTS

| | | | |
|---|---|---|---|
| 2017/0061445 A1* | 3/2017 | Sunkle | G06F 40/30 |
| 2017/0236129 A1 | 8/2017 | Kholkar et al. | |
| 2019/0318362 A1* | 10/2019 | Marascu | G06F 40/40 |
| 2020/0219111 A1* | 7/2020 | Nair | G06F 40/284 |
| 2022/0237565 A1* | 7/2022 | Dzierzanowski | G06Q 30/018 |
| 2023/0237399 A1* | 7/2023 | Hoang | G06N 3/045 |
| | | | 704/9 |
| 2023/0385275 A1* | 11/2023 | Obeidi | G06F 16/243 |

OTHER PUBLICATIONS

Chalkidis et al., "Regulatory Compliance through Doc2Doc Information Retrieval: A case study in EU/UK legislation where text similarity has limitations," (2021).
Kulkarni et al., "Toward Automated Regulatory Compliance," (2021).
Sapkota et al., "RP-Match: A framework for Automatic Mapping of Regulations with Organizational Processes," (2013).

* cited by examiner

SYSTEMS AND METHOD FOR DETERMINING HYGIENE IN ENTERPRISE DOCUMENTS WITH RESPECT TO REGULATORY OBLIGATIONS

PRIORITY CLAIM

This U.S. patent application claims priority under 35 U.S.C. § 119 to: Indian Patent Application No. 202221034374, filed on Jun. 15, 2022. The entire contents of the aforementioned application are incorporated herein by reference.

TECHNICAL FIELD

The disclosure herein generally relates to enterprise document analysis, and, more particularly, to systems and method for determining hygiene in enterprise documents with respect to regulatory obligations.

BACKGROUND

Regulatory compliance management is a top concern for enterprises and hygiene of enterprise documents is of utmost importance. Hygiene, in regulatory compliance management, is referred as the desired state of an enterprise when it can map enterprise documents such as policies, processes and controls to each regulatory obligation and assert correctness and completeness with respect to obligations. With ever increasing regulation and a document centric, manual approach used in current practice enterprises often fail to be compliant. This results in stiff penalties and loss of brand value, Compliance solutions like GRC frameworks leave much of the analysis and synthesis burden for correlating the content on the human experts. State of the art machine learning (ML) techniques for document similarity do not address semantic similarity adequately. Similarly, ontology-based mechanisms addressing semantic similarity, provide no means to identify the differences between texts.

SUMMARY

Embodiments of the present disclosure present technological improvements as solutions to one or more of the above-mentioned technical problems recognized by the inventors in conventional systems.

For example, in one aspect, there is provided a processor implemented method. The method comprises obtaining, via one or more hardware processors, a plurality of regulation documents, and a plurality of enterprise documents; generating, via the one or more hardware processors, a baseline ontology comprising a dictionary having one or more concepts as one or more nodes and one more relations as one or more edges, wherein the baseline ontology is generated based on a first document that is randomly selected from the plurality of regulation documents or the plurality of enterprise documents; obtaining, via the one or more hardware processors, an extended ontology based on the baseline ontology; creating, via the one or more hardware processors, a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents, wherein the step of creating a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents comprises; (i) merging one to one matched concepts comprised in the one or more subsequent baseline ontologies associated with one or more subsequent documents (OB) with the common navigable ontology; (ii) merging one or more unique concepts in the one or more subsequent baseline ontologies that do not match the one or more concepts comprised in the common navigable ontology; (iii) recommending for merging a concept from the one or more subsequent baseline ontologies that match to two to more concepts comprised in the common navigable ontology, wherein merging the concept is recommended to distribute one or more mentions in the one or more concepts comprised in the common navigable ontology; and (iv) merging one or more associated relations of a plurality of concepts comprised in the one or more subsequent baseline ontologies being merged with a plurality of corresponding concepts comprised in the common navigable ontology; identifying, by using the common navigable ontology via the one or more hardware processors, one or more similarities and one or more gaps in the plurality of regulation documents and the plurality of enterprise documents; identifying, by using the common navigable ontology via the one or more hardware processors, a plurality of matched statements and a plurality of gaps across the plurality of enterprise documents; generating one or more citations and one or more statements from a natural language search query using an associated ontology footprint by using the common navigable ontology, wherein the associated ontology footprint is obtained by identifying mentions of the one or more concepts in a search string; and determining hygiene in the plurality of enterprise documents with respect to a plurality of regulatory obligations based on the at least one of (i) the one or more similarities and the one or more gaps in the plurality of regulation documents and the plurality of enterprise documents, (ii) the plurality of matched statements and the plurality of gaps across the plurality of enterprise documents; and (iii) the one or more citations and the one or more statement.

In an embodiment, the step of generating the baseline ontology comprises extracting a plurality of sentences, a plurality of noun phrases, a plurality of Subject Verb Object (SVO) triplets, from the first document; extracting, a plurality of key-terms from the plurality of sentences from the first document, wherein a score is associated with each of the plurality of key-terms, and wherein the plurality of key-terms serves as a plurality of candidates for the one or more concepts; creating a dictionary based on the plurality of key-terms as the one or more concepts and the plurality of noun phrases ending with the plurality of key-terms as a corresponding mention of the one or more concepts; creating the one or more relations from the plurality of SVO triplets that contain one or more references to the one or more concepts; and creating the baseline ontology from the dictionary and the one or more relations.

In an embodiment, a rank of a concept from the one or more concepts is determined based on a number of times the concept is cross-referenced.

In an embodiment, the baseline ontology is modified to obtain the extended ontology by creating a purpose specific ontology by filtering redundant and unimportant one or more concepts, one or more mentions and one or more relations from the baseline ontology; performing a SVO search for the one or more concepts and the one or more relations comprised in the baseline ontology to identify one or more new related concepts, one or more new associated mentions or relations; and obtaining the extended ontology by adding at least one of the one or more new related concepts, and the one or more new associated mentions or relations in the baseline ontology.

In an embodiment, the SVO search is initiated from a concept having a highest score.

In an embodiment, each subsequent baseline ontology is modified to obtain an associated extended ontology based on a current common navigable ontology being generated.

In another aspect, there is provided a processor implemented system. The system comprises: a memory storing instructions; one or more communication interfaces; and one or more hardware processors coupled to the memory via the one or more communication interfaces, wherein the one or more hardware processors are configured by the instructions to: obtain a plurality of regulation documents, and a plurality of enterprise documents; generate a baseline ontology comprising a dictionary having one or more concepts as one or more nodes and one more relations as one or more edges, wherein the baseline ontology is generated based on a first document that is randomly selected from the plurality of regulation documents or the plurality of enterprise documents; obtain an extended ontology based on the baseline ontology; create a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents, wherein the common navigable ontology that is created based on (i) the extended ontology associated with the first document and (ii) one or more subsequent baseline ontologies associated with one or more subsequent documents that are selected from remaining documents comprised in the at least one of the plurality of regulation documents and the plurality of enterprise documents comprises; (i) merging one to one matched concepts comprised in the one or more subsequent baseline ontologies associated with one or more subsequent documents with the common navigable ontology; (ii) merging one or more unique concepts in the one or more subsequent baseline ontologies that do not match the one or more concepts comprised in the common navigable ontology; (iii) recommending for merging a concept from the one or more subsequent baseline ontologies that match to two to more concepts comprised in the common navigable ontology, wherein merging the concept is recommended to distribute one or more mentions in the one or more concepts comprised in the common navigable ontology; and (iv) merging one or more associated relations of a plurality of concepts comprised in the one or more subsequent baseline ontologies being merged with a plurality of corresponding concepts comprised in the common navigable ontology; identify, by using the common navigable ontology, one or more similarities and one or more gaps in the plurality of regulation documents and the plurality of enterprise documents; identify, by using the common navigable ontology, a plurality of matched statements and a plurality of gaps across the plurality of enterprise documents; generate one or more citations and one or more statements from a natural language search query using an associated ontology footprint by using the common navigable ontology, wherein the associated ontology footprint is obtained by identifying mentions of the one or more concepts in a search string; and determine hygiene in the plurality of enterprise documents with respect to a plurality of regulatory obligations based on the at least one of (i) the one or more similarities and the one or more gaps in the plurality of regulation documents and the plurality of enterprise documents, (ii) the plurality of matched statements and the plurality of gaps across the plurality of enterprise documents; and (iii) the one or more citations and the one or more statements.

In an embodiment, the baseline ontology is generated by extracting a plurality of sentences, a plurality of noun phrases, a plurality of Subject Verb Object (SVO) triplets, from the first document; extracting, a plurality of key-terms from the plurality of sentences from the first document, wherein a score is associated with each of the plurality of key-terms, and wherein the plurality of key-terms serves as a plurality of candidates for the one or more concepts; creating a dictionary based on the plurality of key-terms as the one or more concepts and the plurality of noun phrases ending with the plurality of key-terms as a corresponding mention of the one or more concepts; creating the one or more relations from the plurality of SVO triplets that contain one or more references to the one or more concepts; and creating the baseline ontology from the dictionary and the one or more relations.

In an embodiment, a rank of a concept from the one or more concepts is determined based on a number of times the concept is cross-referenced.

In an embodiment, the baseline ontology is modified to obtain the extended ontology by creating a purpose specific ontology by filtering redundant and unimportant one or more concepts, one or more mentions and one or more relations from the baseline ontology; performing a SVO search for the one or more concepts and the one or more relations comprised in the baseline ontology to identify one or more new related concepts, one or more new associated mentions or relations; and obtaining the extended ontology by adding at least one of the one or more new related concepts, and the one or more new associated mentions or relations in the baseline ontology.

In an embodiment, the SVO search is initiated from a concept having a highest score.

In an embodiment, each subsequent baseline ontology is modified to obtain an associated extended ontology based on a current common navigable ontology being generated.

In yet another aspect, there are provided one or more non-transitory machine-readable information storage mediums comprising one or more instructions which when executed by one or more hardware processors cause obtaining a plurality of regulation documents, and a plurality of enterprise documents; generating a baseline ontology comprising a dictionary having one or more concepts as one or more nodes and one more relations as one or more edges, wherein the baseline ontology is generated based on a first document that is randomly selected from the plurality of regulation documents or the plurality of enterprise documents; obtaining an extended ontology based on the baseline ontology; creating, via the one or more hardware processors, a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents, wherein the step of creating a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents comprises: (i) merging one to one matched concepts comprised in the one or more subsequent baseline ontologies associated with one or more subsequent documents with the common navigable ontology; (ii) merging one or more unique concepts in the one or more subsequent baseline ontologies that do not match the one or more concepts comprised in the common navigable ontology; (iii) recommending for merging a concept from the one or more subsequent baseline ontologies that match to two to more concepts comprised in the common navigable ontology, wherein merging the concept is recommended to distribute one or more mentions in the one or more concepts comprised in the common navigable ontology; and (iv) merging one or more associated relations of a plurality of concepts comprised in the one or more subsequent baseline ontologies being merged with a plurality of corresponding concepts comprised in the common navigable ontology; identifying, by using the common navigable ontology, one or more similarities and one or more gaps in the plurality of regulation documents and the plurality of enterprise documents; identifying, by using the common navigable ontology, a plurality of matched statements and a plurality of gaps across the plurality of enterprise documents; generating one or more citations and one or more statements from a natural language search query using an associated ontology footprint by using the common navigable ontology, wherein the associated ontology footprint is obtained by identifying mentions of the one or more concepts in a search string; and determining hygiene in the plurality of enterprise documents with respect to a plurality of regulatory obligations based on the at least one of (i) the one or more similarities and the one or more gaps in the plurality of regulation documents and the plurality of enterprise documents, (ii) the plurality of matched statements and the plurality of gaps across the plurality of enterprise documents; and (iii) the one or more citations and the one or more statements.

In an embodiment, the step of generating the baseline ontology comprises extracting a plurality of sentences, a plurality of noun phrases, a plurality of Subject Verb Object (SVO) triplets, from the first document; extracting, a plurality of key-terms from the plurality of sentences from the first document, wherein a score is associated with each of the plurality of key-terms, and wherein the plurality of key-terms serves as a plurality of candidates for the one or more concepts; creating a dictionary based on the plurality of key-terms as the one or more concepts and the plurality of noun phrases ending with the plurality of key-terms as a corresponding mention of the one or more concepts; creating the one or more relations from the plurality of SVO triplets that contain one or more references to the one or more concepts; and creating the baseline ontology from the dictionary and the one or more relations.

In an embodiment, a rank of a concept from the one or more concepts is determined based on a number of times the concept is cross-referenced.

In an embodiment, the baseline ontology is modified to obtain the extended ontology by creating a purpose specific ontology by filtering redundant and unimportant one or more concepts, one or more mentions and one or more relations from the baseline ontology; performing a SVO search for the one or more concepts and the one or more relations comprised in the baseline ontology to identify one or more new related concepts, one or more new associated mentions or relations; and obtaining the extended ontology by adding at least one of the one or more new related concepts, and the one or more new associated mentions or relations in the baseline ontology.

In an embodiment, the SVO search is initiated from a concept having a highest score.

In an embodiment, each subsequent baseline ontology is modified to obtain an associated extended ontology based on a current common navigable ontology being generated.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
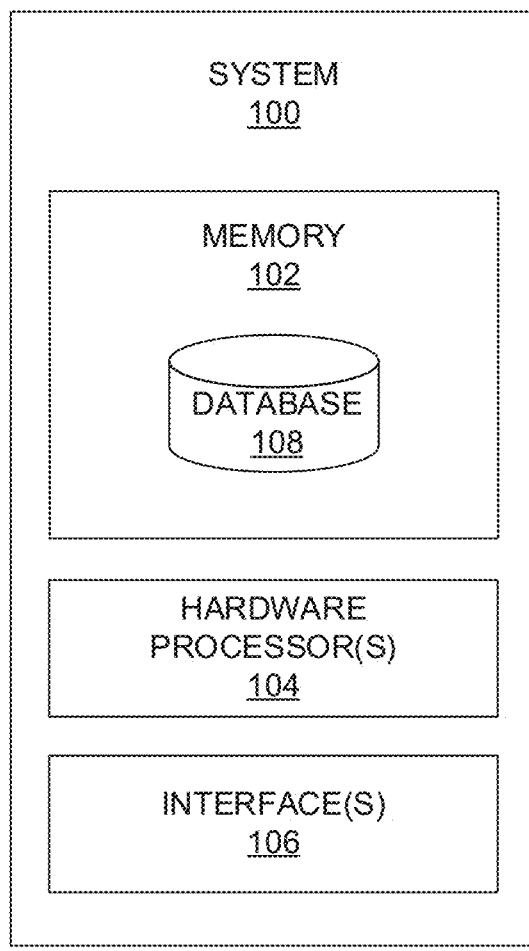
FIG. 1 depicts an exemplary system for determining hygiene in a plurality of enterprise documents with respect to a plurality of regulatory obligations, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Enterprises need assurance that their internal documents like policies, procedures, controls, standard operating procedures (SOPs) are adherent to the regulatory obligations. This is referred to as a desired state of 'hygiene' for an enterprise with respect to all its regulatory obligations. In current practice, regulations are first interpreted by legal experts to identify all the obligations. A 'contextualized regulation' containing a list of obligations applicable to enterprise may then be prepared by legal experts working in collaboration with business experts from the enterprise. This involves interpreting these obligations from perspective of various business functions to determine applicability. Subsequently, enterprises respond by putting in place policies to enforce the obligations and implement policies through appropriate procedures and controls to mitigate risks and comply with regulations.

As is apparent, this is a document-centric process that involves experts from legal, business, and domain to come together. Governance risk and compliance (GRC) frameworks help experts with collaboration but do not provide automation aids necessary to reduce the analysis and synthesis burden. This can often lead to fatigue induced errors of commission and omission. Despite high effort and costs there is no assurance of full coverage or completeness in addressing the impact of obligations on internal documents.

Automation aids can obviously help in analyzing such impacts. Some approaches use Natural language processing (NLP) and Machine learning (ML) techniques for identification of obligations. However, these techniques may fail to suggest on how this can be extended to enterprise documents or used for establishing hygiene. Traditionally, research has been done on the automated detection of reference structures in legal text which attempts to resolve explicit references across text. However, enterprise documents implementing the obligations usually do not contain explicit references to the regulatory obligations. These challenges need to be addressed for assurance of hygiene.

Embodiments of the present disclosure provide system and method for determining hygiene in the plurality of enterprise documents with respect to the plurality of regulatory obligations. More specifically, the system and method of the present disclosure explore Natural Language Processing (NLP) options because the process involves documents which are primarily natural language text. A conceptual modeling method works well for extracting concept ontologies, while grounding the ontologies using a dictionary of <concept>, <mentions> tuples. The system and method of the present disclosure extend this approach for the extraction of concept ontology models from multiple enterprise documents, while enabling navigation across multiple documents via the ontology. The system and method of the present disclosure further reason out how this form of navigation or creating a common navigable ontology can help establish hygiene in enterprise documents with respect to regulatory obligations.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 depicts an exemplary system 100 for determining hygiene in a plurality of enterprise documents with respect to a plurality of regulatory obligations, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 182 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database (or a file system) 108 is comprised in the memory 102, wherein the database 108 comprises a plurality of regulation documents, a plurality of enterprise documents, various ontologies (e.g., one or more baseline ontologies, one or more extended ontologies, one or more common navigable ontologies, and the like. The database 108 further comprises one or more matched concepts, one or more unique concepts, merged concepts, one or more mentions of various concepts, information pertaining to one or more similarities and one or more gaps identified in various documents, ontology footprint(s), subject-verb-object (SVO) triplets, one or more relations from the one or more SVO triplets, rank associated with each concept, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
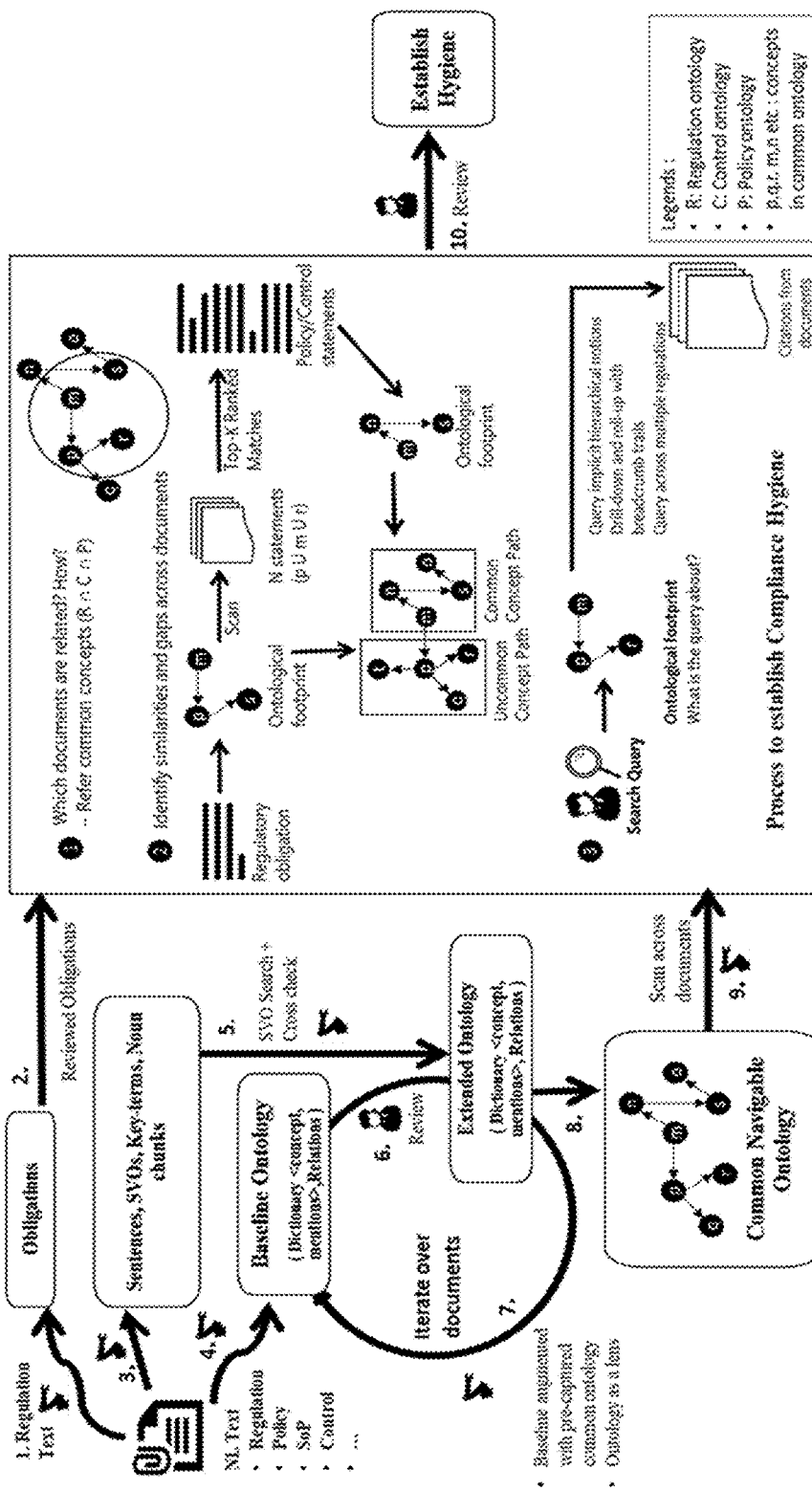
FIG. 2 depicts an exemplary high level block diagram of the system for determining the hygiene in the plurality of enterprise documents with respect to the plurality of regulatory obligations, in accordance with an embodiment of the present disclosure.

FIG. 2 depicts an exemplary high level block diagram of the system 100 for determining hygiene in the plurality of enterprise documents with respect to the plurality of regulatory obligations, in accordance with an embodiment of the present disclosure.

Figure 3:
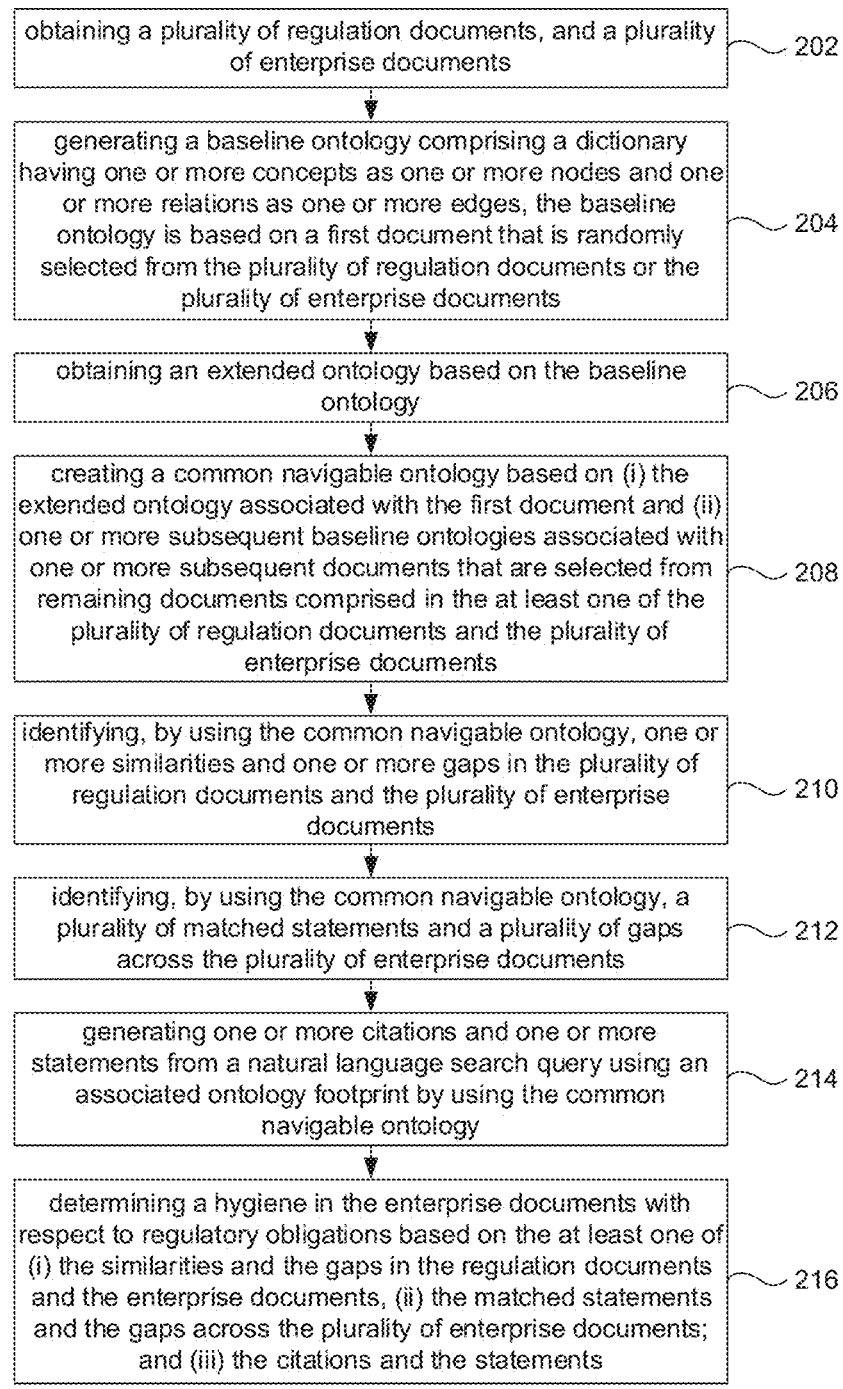
FIG. 3 depicts an exemplary flow chart illustrating a method for determining the hygiene in the plurality of enterprise documents with respect to the plurality of regulatory obligations, using the systems of FIGS. 1-2, in accordance with an embodiment of the present disclosure.

FIG. 3 depicts an exemplary flow chart illustrating a method for determining hygiene in the plurality of enterprise documents with respect to the plurality of regulatory obligations, in accordance with an embodiment of the present disclosure, using the systems 100 of FIGS. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3.

At step 202 of the present disclosure, the one or more hardware processors 104 obtain a plurality of regulation documents (also referred as regulation documents or regulations and interchangeably used herein), and a plurality of enterprise documents (also referred as enterprise documents and interchangeably used herein). In an embodiment, the plurality of enterprise documents comprises but are not limited to standard operating procedures (SOPs), enterprise policies, control policies, and the like. The plurality of regulation documents comprises but are not limited to regulations issued by various authorities in a specific region/location/geography, Circulars issued by various governing bodies, and the like.

At step 204 of the present disclosure, the one or more hardware processors 104 generate a baseline ontology (OB) comprising a dictionary having one or more concepts as one or more nodes and one or more relations as one or more edges. The baseline ontology is generated based on a first document that is randomly selected from the plurality of regulation documents or the plurality of enterprise documents. For instance, the first document is randomly selected from either the regulation documents or enterprise documents. Using the first document, the baseline ontology is generated/created. The automatic extraction of a baseline ontology by the system 100 enables (users such as a subject matter expert or a domain expert) to unearth (or identify) key concepts, their mentions, and relationships. A key difference in the present disclosure vis-à-vis conventional approaches is in terms of extraction of baseline ontologies for each document. Some conventional approaches require the expert to feed seed concepts and initial dictionary for baseline ontology creation. Further recommendations are provided according to the expert's input. Whereas the method of the present disclosure generates a baseline ontology with important concepts and relationships between concepts automatically. This ontology may be further enhanced by the users (e.g., the experts) with their knowledge of the domain using suitable automation aids.

Baseline ontology is created by first extracting the sentences, noun phrases, and clauses from the input text comprised in the first document that is randomly selected from the regulation documents or enterprise documents. Clause is the subject-verb-object triple in a sentence. This is referred a triplet comprising Subject Verb Object (SVO). The system 100 then use text-ranking algorithm as known in the art (e.g., a variant of page-ranking algorithm discussed in King Gary, Patrick Lam, and Margaret Roberts. "Computer Assisted Keyword and Document Set Discovery from Unstructured Text." (2014). http//citeseerx.ist.psu.edu/viewdoc/download? doi=10.1.1.458. 1445 & rep=rep 1 & type=pdf.) to extract important key-terms along with their scores. These key-terms are likely candidates for concepts as they represent the important terms from the text comprised in the first document. Higher ranking indicates that a concept is more cross-referenced within the text and hence more important. In other words, a rank of a concept from the one or more concepts is determined based on a number of times the concept is cross-referenced. The number of key-terms to be extracted is configurable in the system 100. Table 1 illustrates the precision and recall values when applying automated baseline extraction for key-term configurations at values 5, 10 and 20. The reference model for comparison is the refined ontology model prepared by the users (e.g., domain experts) who reviewed the baseline model for correctness and completeness. The baseline model is compared with the reference model to compute precision and recall values for automatically extracted concepts and mentions. Precision refers to the number of true positives extracted in the baseline model divided by the total number of retrieved instances, either concepts or mentions as applicable, in the baseline model. For example, with key terms configured at 5, totally 5 concepts were extracted in the baseline model, of which all the concepts were true positives confirmed by identifying these concepts in the reference model, hence precision was 5/5, or 1. Recall refers to the number of true positives in the baseline model divided by the total number of retrieved instances, either concepts or mentions as applicable, in the reference model. Continuing with the earlier example at key term configuration value 5, while the 5 concepts extracted in the baseline model were all true positives, there were totally 88 concepts in the reference model, therefore resulting in a recall value of 5/88, or approximately 0.057.

TABLE 1

| Key-terms | Concept precision | Concept Recall | Mention Precision | Mention Recall |
|---|---|---|---|---|
| 5 | 1 (5/5) | 0.057 (5/88) | 0.791 (34/43) | 0.117 (34/291) |
| 10 | 0.714 (10/14) | 0.114 (10/88) | 0.766 (59/77) | 0.203 (59/291) |
| 20 | 0.75 (18/24) | 0.204 (18/88) | 0.762 (99/130) | 0.340 (99/291) |

Figure 4:
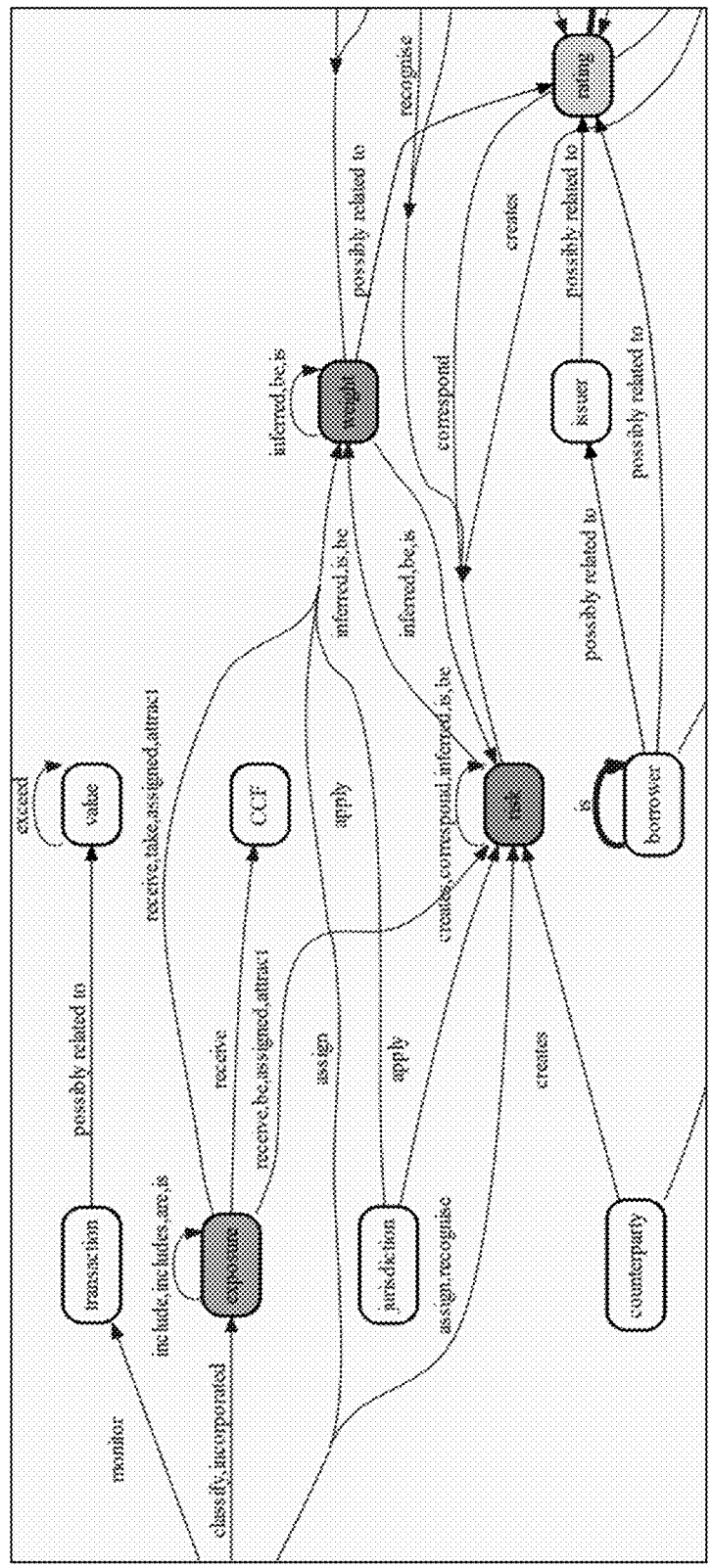
FIG. 4 illustrates an exemplary baseline ontology created from Basel regulation for "Standardized approach to Credit Risk", in accordance with an embodiment of the present disclosure.

It is evident from the above Table 1 that the precision values are best for lower key-term configurations and tend to deteriorate for higher configuration values, still retaining precision greater than 0.7 for configuration values up to 20. However, recall tends to improve for higher configurations. The precision and recall values therefore seem acceptable for refinement of the baseline ontology by experts later. Finally, the baseline ontology is created by computing/creating the dictionary and relations. The dictionary is created by considering the key-terms as concepts and noun phrases ending with the key-term as mentions of the concept. The relations are created from the SVCS triplets that contain references to captured concepts. FIG. 4, with reference to FIGS. 1 through 3, illustrates an exemplary baseline ontology created from Basel regulation for "Standardized approach to Credit Risk", in accordance with an embodiment of the present disclosure. The baseline ontology as shown in FIG. 4 is a partial view and hence there are line/arrows that are cropped and not connected to other blocks and hanging. The partial view of the baseline ontology is depicted in FIG. 4 for better understanding of the method described herein.

In a nutshell, the baseline ontology is generated by extracting a plurality of sentences (e.g., sentence from regulation document such as "Customer risk profiles will assist the bank in further determining if the customer or customer category is higher risk and requires the application of enhanced CDD measures and controls"), a plurality of noun phrases (e.g., Bank, identified risks, risk profile, CDD, customer acceptance, etc.), a plurality of Subject Verb Object (SVO) triplets (e.g., Customer risk profiles <Verb: will assist>bank), from the first document. Further, a plurality of key-terms are extracted from the plurality of sentences from the first document, wherein a score is associated with each of the plurality of key-terms (e.g., for key-term 'bank' score is 8.47082395338918, similarly for risk the score is 8.205950406362843, for customer the score is 6.159824364405347, for key-term information the score is 6.101185280320912), and wherein the plurality of key-terms serves as a plurality of candidates for the one or more concepts. Further, a dictionary is created based on the plurality of key-terms as the one or more concepts and the plurality of noun phrases ending with the plurality of key-terms as a corresponding mention of the one or more concepts. Furthermore, the one or more relations are created from the plurality of SVO triplets that contain one or more references to the one or more concepts. The baseline ontology is created from the dictionary and the one or more relations.

An important benefit of the extracted/created baseline ontology is the grounding of concepts via mentions. This enables mapping of sentences to concepts and vice versa. However, there are some limitations. For example, consider following sentence from the same regulation—"Third parties routinely used by banks to apply their customer identification obligations include retard deposit brokers, mortgage brokers and solicitors". While baseline model/ontology captures the terms (e.g., as the bold text mentioned above) as different concepts, these are probably best represented as mentions of the same concept. Hence, an expert review may be necessary to refine the baseline ontology as per the domain and to establish completeness and correctness. In the present disclosure, the system 100 and method implemented and described herein may implement a scoring mechanism as known in the art to compute and assign a score for each of the plurality of key-terms.

Referring to steps of FIG. 3, at step 206 of the present disclosure, the one or more hardware processors 104 obtain an extended ontology based on the baseline ontology. In other words, the extended ontology is created using the baseline ontology. More specifically, the baseline ontology is modified to obtain the extended ontology by creating a purpose specific ontology by filtering redundant and unimportant one or more concepts, one or more mentions and one or more relations from the baseline ontology. A SVO search is then performed for the one or more concepts and the one or more relations comprised in the baseline ontology to identify one or more new related concepts, one or more new associated mentions or relations. The extended ontology is then obtained by adding at least one of the one or more new related concepts, and the one or more new associated mentions or relations in the baseline ontology. The above steps of obtaining the extended ontology are better understood by way of following description:

The system 100 helps users (e.g., experts) which leads to refinement and creation of a purpose specific ontology. Firstly, the baseline ontology is scanned and cleaned to remove redundant, unimportant concepts, mentions, and relations. Starting with the concept(s) having a highest score in the baseline ontology, a SVO search is performed to uncover additional concepts and relations. SVO search refers to searching for either concepts as subject/object, a verb, or a combination of all three over the text comprised in the first document or the baseline ontology. Typically inputs to SVO search are concepts and relations from baseline ontology, and the intent is to discover related concepts, their mentions, or relations that are not already captured in the baseline. Searches return a list of extracted SVOs and sentences. These are highlighted as the terms not captured in ontology which helps to identify new concepts, new mentions for existing concepts and relations. Any missing and relevant concepts, mentions, and relations may be added by via of inputs from the domain experts. For example, processing of the Basel regulation, revealed "Bank" as an important concept with highest score in the baseline ontology. Searching for "Bank" helped identify "Customer Risk profiles" as a new concept to be added as per the extracted SVO: Customer risk profiles <Verb: will assist>bank. Corresponding sentence from the regulation document is—"Customer risk profiles will assist the bank in further determining if the customer or customer category is higher-risk and requires the application of enhanced COD measures and controls". The baseline ontology can also help enable visual aids to perform a 'cross-check' on the text for full coverage in the baseline ontology. A quick visual scan of highlighted concepts in text can reveal lacunae to experts easily, and missing concepts or mentions can be incorporated.

Referring to steps of FIG. 3, at step 208 of the present disclosure, the one or more hardware processors 104 create a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents. Conventional approaches (e.g., refer Sunkle et al. —"Sunkle S., Kholkar D., Kulkarni V. (2016) Comparison and Synergy Between Fact Orientation and Relation Extraction for Domain Model Generation in Regulatory Compliance. In: Comyn Wattiau I., Tanaka K., Song IY., Yamamoto S., Saeki M. (eds) Conceptual Modeling. ER 2016. Lecture Notes in Computer Science, vol 9974. Springer, Cham", and Roychoudhury et al—"S. Roychoudhury, S. Sunkle, D. Kholkar and V. Kulkarni," "From Natural Language to SBVR Model Authoring Using Structured English for Compliance Checking," 2017 IEEE 21st International Enterprise Distributed Object Computing Conference (EDOC), 2017, pp. 73 78, doi: 10.ss09/EDOC.2017.19.) enabling extraction of ontology from a regulation document is premised on the notion that each document has a purpose, and the extraction process is aimed at identification of concepts and relations representing just that purpose. For instance, regulations intend to express guidelines and obligations for a specific class or classes of enterprises, while policies such as Cyber security policy or Human Resource (HR) policy are enterprise specific documents that state intent and guidelines to be followed within the enterprise for a defined area of enterprise functions. The system and method of the present disclosure aim to extend the Sunkle et al. and Roychoudhury et al, to the problem of regulatory hygiene wherein the system 100 attempts to identify concepts and relations that are necessary and sufficient to represent the purpose that is captured in a set of documents while enabling navigation from one document specific ontology to another.

The need to identify hoer specific sentences from a source document, say a regulation, are correlated with specific sentences in a target document, for instance a policy, is one of the sub-problems for regulatory hygiene. In such cases, the navigation via ontology is simply a traversal of ontology graphs where concepts are the nodes and relations represent edges of the graph. The navigation starts from concepts present in specific statements of a source document and traverses through a set of paths in the graph to end at concepts present in statements of a target document. Since intent, guidelines, obligations, etc. are expressed in the form of statements that are compositions of concepts and their relations in part, such navigation is expected to help correlate these notions across documents quickly and perform a gap assessment of the text.

In the case of related documents, such as policies or procedure documents that address one or more regulatory obligations, the document specific ontologies are expected to have an overlap with each other. Such an overlap is a natural expression of the relatedness that captures commonly occurring concepts and relations across the documents. However, in both cases where document specific ontologies are captured through either a manual or a semi-automated process, disparate concept names, mentions, and relations may be assigned because of the subjective nature, context of the document, applicable jargon etc. This would obviously hinder attempts to use such ontologies to establish correlations, hence there is a need to address this challenge.

Independently built ontologies could be merged so that a single ontology can represent knowledge of all documents, thereby enabling navigation. Ontology merging is a well-known problem in Natural Language Processing (NLP) domain and lot of work enables ontology merging (e.g., refer "D. H. Fudholi, W. Rahayu and E. Pardede," "CODE (Common Ontology DEvelopment): A Knowledge Integration Approach from Multiple Ontoloaies," 2014 IEEE 28th International Conference on Advanced Information Networking and Applications, 2014, pp. 751 758, doi; 10.1109/AINA.2014.92. "Pavel Shvaiko, Jérôme Euzenat. Ontology matching: state of the art and future challenges. IEEE Transactions on Knowledge and Data Engineering, Institute of Electrical and Electronics Engineers, 2013, 25 (1), pp. 158 176. <10.1109/TKDE.2011.253>. <hal 00917910>", and N. F. Noy, "Tools for mapping and merging ontologies," Handbook on Ontologies, Springer, 2004). However, these approaches are ineffective in the context of regulatory hygiene due to the use of different terminologies in regulation and enterprise documents, and the lack of methods to address the issues that arise thereof.

System 100 of the present disclosure implement the method of FIG. 3 based on sequential development of the ontologies instead (however, the sequence may not follow a specific order of creation). This involves extracting the ontology from one document and then using it as a lens to inspect the text of other documents for assimilating new knowledge. Such usage of the ontology is possible because of extraction (as described by the present disclosure herein) of a supporting dictionary which mentions ground concepts in words or phrases in the document text. The lens helps to identify if concepts are referred with same mentions in the new document. The matched concepts form the baseline for the new document and can be refined further with the aids. This approach as described herein for creating the common navigable ontology overcomes the limitations described earlier, enables reuse of prior knowledge, and ensures that ontologies created this way are navigable by design hence reducing efforts in semantic matching of content. Additionally, this approach for creating the common navigable ontology is powerful due to (a) generic nature of the contextual knowledge captured in an ontological form (b) its inherent ability to assimilate new knowledge or changes in this knowledge without compromising on the integrity of the model (c) expected improvements in efficiency of ontology extraction with each new document as the new concepts discovered in (n+1)th document are expected to be less than nth document for sufficiently large n.

It is to be noted and understood by a person having ordinary skill in the art or person skilled in the art that the extended ontology associated with the first document serves as a basis and treated as an intermediatory common navigable ontology for a first iteration (e.g., first document randomly selected). This intermediatory common navigable ontology gets updated by using subsequent baseline ontologies associated with one or more subsequent documents that are selected from remaining documents comprised in the at least one of the plurality of regulation documents and the plurality of enterprise documents. For instance, say a second document is randomly selected from the plurality of regulation documents or the plurality of enterprise documents.

Baseline ontology and extended ontology are further generated for the second document. The extended ontology gets appended or updated to the intermediatory common navigable ontology to obtain another intermediatory common navigable ontology for a second iteration. This process is repeated until the last document from plurality of regulation documents or the plurality of enterprise documents is selected and processed for extended ontology creation thus resulting into a final common navigable ontology. Each subsequent baseline ontology is modified to obtain an associated extended ontology based on a current common navigable ontology being generated.

The step of creating the common navigable ontology that is based on (i) the extended ontology associated with the first document and (ii) one or more subsequent baseline ontologies associated with one or more subsequent documents that are selected from remaining documents comprised in the at least one of the plurality of regulation documents and the plurality of enterprise documents comprises: (a) merging one to one matched concepts comprised in the one or more subsequent baseline ontologies associated with one or more subsequent documents with the common navigable ontology; (b) merging one or more unique concepts in the one or more subsequent baseline ontologies that do not match the one or more concepts comprised in the common navigable ontology; (c) recommending for merging a concept from the one or more subsequent baseline ontologies that match to two to more concepts comprised in the common navigable ontology, wherein merging the concept is recommended to distribute one or more mentions in the one or more concepts comprised in the common navigable ontology; and (d) merging one or more associated relations of a plurality of concepts comprised in the one or more subsequent baseline ontologies being merged with a plurality of corresponding concepts comprised in the common navigable ontology. Each of the steps (a), (b), (c) and (d) are described in further detail as below:

The above step of (a) merging the one to one matched concepts comprised in the one or more subsequent baseline ontologies associated with one or more subsequent documents (OB) with the common navigable ontology is better understood by way of following description: Concept matching refers to matching of concepts in two ontologies. Concepts are matched on the basis of mentions as they are actual references in a given text. Mention matching refers to finding similarity of mentions between different ontologies. The mentions can be exact matches or S-Bert matches (as known in the art) with a similarity score. Higher the similarity score, more similar are the mentions. For example, score higher than 0.8 from a possible range of 0-1 More specifically, the one-to-one matched concepts comprised in the one or more subsequent baseline ontologies associated with one or more subsequent documents (OB) are merged with the common navigable ontology. Baseline ontology (OB) extracted for subsequent document is compared with a previously extended ontology (OE). A concept CB extracted in OB matches with only one concept CE captured in OE. The concept CB only matches with one concept in OE when all or some of its mentions are captured as mentions of only once as concept CE in OE. The new mentions in CB that are not captured previously in the OE, are added along with other mentions of CE to form the updated concept called CC which is then moved to OC. For example, CE→Concept: Financial Institution→Mentions: {bank, financial institution}, and CB→Concept: bank→Mentions: {bank, banks, correspondent bank}. CB has mention 'bank' which matches with only CE in the extended ontology OE. In this case CB is merged with CE, which means that the new mentions 'banks', and 'correspondent bank' are added to CE, and the concept is updated in the common ontology. The resulting concept CC, in the common ontology, is shown as: CC→Concept: Financial Institution→Mentions: {bank, financial institution, banks, correspondent bank}.

The above step of (b) merging one or more unique concepts in the one or more subsequent baseline ontologies that do not match the one or more concepts comprised in the common navigable ontology is better understood by way of following description: Unique concept(s) is/are extracted in OB which does not match with any concept in OE. Such concepts are unique to the newer document and are important with respect to subsequent documents and hence should be captured in OC. Such unique concepts are added as new concepts in OC. For example, OB has concepts {P, Q, R} while OE has concepts {M, N}. None of the OB concepts match with any concept in OE. In this case the concepts P, Q, R are all moved to OC as is. Consequently, OC has all the concepts P, Q, R, M, and N.

The above step of (c) recommending for merging a concept from the one or more subsequent baseline ontologies that match to two to more concepts comprised in the common navigable ontology, wherein merging the concept is recommended to distribute one or more mentions in the one or more concepts comprised in the common navigable ontology is better understood by way of following description; A concept CB extracted from OB matches with two or more concepts captured in OE. The concept CB matches with one or more concepts in OE when its mentions are captured as mentions of different concepts in OE. The mentions of CB which are already captured in OE do not require any validation. But for the new mentions of CB which are not captured in OE, recommendations are provided by the system 100. These recommendations are one or more of the following in a preferred sequence: (i) merging a mention with concept in OE with maximum S-Bert similarity score, (ii) merging a mention with a hierarchal concept, either new or existing, parent or child, and (iii) create a new concept. For example, say concept CB from OB matches with multiple concepts CE1, CE2, CE3 from OE because of distribution of mentions of CB across the concepts CE1, CE2, CE3. Recommendations for new mentions M5, M6 from CB which do not match with concepts CE1, CE2, and CE3 is provided by the system 100.

The above step of (d) merging one or more associated relations of a plurality of concepts comprised in the one or more subsequent baseline ontologies being merged with a plurality of corresponding concepts comprised in the common navigable ontology is better understood by way of following description: After all the mentions and concepts are merged, SVO triplets with OC concepts present as subject and object are extracted as relations of subsequent document. This extracted set of relations is compared with the existing relation in OE, The following scenarios occur during the comparison: (a) relation with same lemma form is automatically merged in OC. For instance, Relation in OE: Bank <verifies> Customer, extracted relation of new document: Bank <verify> Customer. Since, relation 'verify' and 'verifies' have same base lemma, the relation from OB is auto merged in OC. OC: Bank <verifies> Customer. (b) Unique relation from extraction is auto merged in OC. For instance: extracted relation of new document: A <relation> B (e.g., Bank<opens>Account). The relation does not match with any relation in OE. Hence, it's a unique relation from subsequent document. This relation is automatically added in OC. (c) Synonymous relations are identified by the system 100 and auto merged. For instance, relation in OE: Bank <verifies> Customer. Extracted relation of new document: Bank <checks> Customer. Since, relation 'verify' and 'checks' are synonyms, the relation from OB is auto merged in OC and relation from OE is retained in OC. OC (default): Bank <verifies> Customer. A trace of auto merged actions along with reasoning such as "synonymous relations" or "same lemma" or "synonymous mentions" that allows user to take corrective actions is provided by the system 100.

Referring to steps of FIG. 3, at step 210 of the present disclosure, the one or more hardware processors 104 identify, by using the common navigable ontology, one or more similarities and one or more gaps in the plurality of regulation documents and the plurality of enterprise documents. The above step 210 is better understood by way of following description: An intersection of the set of concepts contained in ontologies for 'n' documents can quickly reveal conceptual commonality across the documents, therefore hinting at possible factual or semantic correlations in their content. Assuming ontologies are good, meaning all the concepts of interest are captured and this has been verified (e.g., say by domain experts), this also implies that documents having conceptual commonalities are the only documents of interest for establishing correlations, and the rest can be ignored. Filters can be applied selecting only specific concepts as being of interest for checking correlations, further reducing the search space in terms of documents that need to be processed. The process can reveal some useful markers to make searches more effective:

1. When $(R \cap C \cap P)! = \phi$, this provides a comprehensive set of documents that should be processed to establish correlations, wherein R refers to the set of concepts in regulation documents, C refers to set of concepts in circular(s), and P refers to set of concepts in policy documents.
2. When $\cap (R \cap C \cap P)$ is high, this measure may be a useful marker in case the intent is to identify and prioritize documents that are in general exhibiting a high chance of conceptual similarity.
3. If concept $C \varepsilon R \cap C \cap P$ and concept C is relevant to a conceptual mapping requirement, then mapping exists? For instance, if the intent is to identify documents that are impacted by a single obligation that is changed in new version of a regulation, this filter can help reduce the search space in this context.

The above step 210 is further better understood by way of following example: Assuming, a bank (e.g., or a financial institution) was keen on designing a target state solution that would drive cognitive automation in their management of regulatory compliance, They were looking for a solution that would help assure hygiene in internal documents like policies and controls with respect to newly published regulations. The relevant set of documents from each class Regulation, Policy and Control was obtained by the system 100. This included:

1. Regulation—Basel Committee guidelines on Banking Supervision, which talks about sound management of risks related to money laundering and financing of terrorism.
2. Policy—Anti-Money Laundering (AML) policy of the bank 3. Control—document describing banks internal controls including steps taken, control owners, and risks mitigated to manage the AML guidelines.

Obligations from the regulations were extracted automatically and reviewed (e.g., say by a domain expert). An ontology was extracted by processing regulation, policy and control sequentially. A summary of the results is provided in below Table 2. This ontology was used for finding sentences similarity and gaps across the documents as described above in the earlier sections.

TABLE 2

| Document | Baseline Concepts | Extended Concepts |
| --- | --- | --- |
| Regulation | 29 | 80 |
| Policy | 18 | 96 |
| Control | 52 | 100 |

Common navigable ontologies enabled the system 100 to identify closest matching sentences from policy and control for the regulatory obligations. For instance, as per the Basel Committee guidelines 'banks should develop a thorough understanding of ML/FT risks present in its customer bases, delivery channels and jurisdictions where it operates. It should collect internal and external information for developing this understanding.' Multiple steps taken by the bank to address this obligation is spread across the policy document and it was challenging to understand the coverage of the obligation through manual assessment. The system 100 identified top matches for the obligation from among the policy sentences. Resulting sentence set included 'training for its employees to understand the business line and company policies to deter risks, identify risk scenarios with respect to customer products and services, geography-based risk ratings' etc. Concept path was generated by the system 100 (not shown in FIGS.) which helped in understanding of influencing factors for risk level discussed in the obligation and its coverage in bank policy. For instance, concept path may include, but is not limited to: Customer <has> Account, Account <resides at>Bank, Bank <required to apply> Risk management, Risk management <involves> Monitoring.

Referring to steps of FIG. 3, at step 212 of the present disclosure, the one or more hardware processors 104 identify, by using the common navigable ontology, a plurality of matched statements and a plurality of gaps across the plurality of enterprise documents. The above step 212 is better understood by way of following description: Enterprise documents should cover all the applicable regulatory obligations for staying compliant. In case of partial coverage of an obligation, a process to identify the gaps for correction and risk mitigation is required.

One of the aids the system 100 and method of FIG. 3 of the present disclosure provide is to identify top 'n' matches among sentences in a 'target' document for a selected obligation from a 'source' regulation. A high degree of commonality in terms of concepts can be a good indicator for semantic similarity between obligations and sentences, just like it was so for documents as described in the above sections. In case of hierarchical relations between concepts, presence of concepts which are upwards in the hierarchy can indicate generalized coverage while downward hierarchical concepts may also indicate specialized coverage in target sentences. For example, the Basel committee guidelines state: "A bank should establish a systematic procedure for identifying and verifying its customers and, where applicable, any person acting on their behalf and any beneficial owner(s).". On the other hand, a bank policy may read as follows: "business functions must apply risk-based procedures to ascertain, where applicable, the identity of the person(s) that eventually are the beneficial owners and take reasonable measures . . . ".

While generalized coverage in target sentences may implicitly address more specialized obligations, in the case of specialized coverage there is a need to collate all the target sentences containing the specialized matches, to check and then assert full coverage as per the source obligation. A list of sentences from target document containing matched concepts, including hierarchical concepts, is easy to obtain. This list needs to be ranked on the basis of above considerations (a) in terms of highest commonality in concepts of source and target sentence, (b) in terms of generalizations of source concepts, if any, and (c) in terms of specializations of source concepts when coverage cannot be established in terms of a concept or its generalizations, Top 'n' matches can be found based on each of (a), (b), (c) from the document in sequence.

Once similar sentences are retrieved, gaps need to be identified for addressing partly implemented obligations in internal document. In general, uncommon concepts, which are present exclusively in either document, may be weak indicators of possible gaps in texts. However, if the gaps present are purely conceptual, rather than factual, identification of uncommon concepts can help uncover them. This is because the ontology captures conceptual knowledge rather than factual knowledge in terms of applicable constraints to be followed that are usually represented by either literal values or range of values in the regulatory text. Remaining gaps, if any, can be identified by visual comparison of the top matches by experts. As an example, the revised version of ISO14971 regulation for medical devices, published in 2018, requires that the 'risk management plan' shall include 'a method to evaluate the overall residual risk and the criteria for acceptability of the overall residual risk'. When the system 100 processes an enterprise document that does not cover 'evaluation methods', or 'acceptability criteria' in the risk management plan, using the method of the present disclosure these concepts show up as being missing or uncommon and help uncover the conceptual gaps in the content that need to be addressed.

In some cases, sentences from source and target documents need to be compared, to understand how these are correlated. The common ontology is useful here as well. A sub-graph of the common ontology that represents all the paths that exist between concepts referred in the source sentence to concepts in the target sentence can help provide the answer to how these statements are conceptually correlated. Consider two sub-graphs representing regulatory and policy statements. The sub-graph for regulation contains 4 concepts C1, C2, C3, C5 with relation C1-C2, C1-C3, C2-C3 and C2-C5. Whereas the sub-graph for policy contains 5 concepts C1, C2, C3, C4, C6 with relation C1-C2, C1-C3, C2-C3, C2-C6, C2-C4 and C3-C4. Nodes C1, C2, and C3 in the two sub-graphs, are concepts that are common to both statements. Nodes C4, C5, and C6 are concepts unique to each document.

Looking at some common concepts, say there exists a direct path from C1 to C2 and C1 to C3 in both documents. Assume that there also exist two different paths connecting C2 and C3, one of which is a direct path C2 to C3 while another path connects the concepts through uncommon concept C4. Common concepts across statements, and paths connecting any pair of concepts, whether common or uncommon, one from each of the statements capture the conceptual correlation between the statements. Along with the visual representation of such an ontology, a summarized text describing the paths through common and uncommon concepts which connect the graphs can also be produced. This text provides a conceptual understanding of how the source and target texts are related in natural language text form and can help experts in identifying gaps.

The above step of 212 is further better understood by way of following example: Assuming, a large bank (e.g., a large middle eastern bank) was interested in solutions to the problem of identification of documents that are impacted by a regulation or regulatory circular. With increasing number of regulations and regulatory circulars, the existing or traditional process of analyzing documents manually to identify policies related to regulatory changes was becoming a big hassle. In this regard, relevant set of documents from each class Regulation, Circular and Policy were provided from the bank to the system 100 which included:
 1. Circular (Issued by a governing body)—Reserve Bank of India (RBI) Circular RBI/2018-19/63 DCB-S.CO.PCB.Cir.No.1/18.01.000/2018-19.
 2. Internal Policy—Access Management Policy.
 3. Regulation—Cyber Security Framework regulation published by Saudi Arabian Monetary Authority (SAMA), a regulator.

The system 100 employed the following approaches for ontology building/creation:
 1. Parallel mode of ontology building/creation and then merging the resulting ontologies.
 2. Sequential ontology budding for regulation, policy, and circular in that order.

While individual ontologies extracted in approach (1) were good, below were some observations:
 1, Concept names captured are often different for different documents. For instance:
   a) Concept <Infrastructure Security> has mention <Network devices>, for the SAMA Regulation
   b) Concept <Business IT Assets> has mention <Network devices>, for the RBI circular
   c) Concept <Information System> has mention <Network devices>, for the access management policy document
 2. Mentions for a concept are synonymous in different documents, for instance:
   a) Concept <Access Management> has mentions <access, access privileges, access policy, user access management>, for the SAMA Regulation
   b) Concept <Access Management> has mentions <Access Control>, for the RBI circular
   c) Concept <Access Management> has mentions <Access Management>, for the Access Control policy
 3. There were inconsistencies in captured concepts with two related concepts combined as one concept in different ontologies, for instance:
   a) Concept <Access Management> in regulation ontology
   b) Concept <User Access> in circular ontology
   c) Concept <Access> in policy ontology All the above scenarios present challenges for merging the ontologies and are difficult to address. Time and efforts were high with approach (1) because of the additional efforts for merging the ontologies. In approach (2) baseline ontologies for regulation was refined (e.g., via inputs from the domain expert) to capture relevant concepts. References to any specific geography in the documents were captured as concepts as well. Ontology built for regulation was used as a lens to look at the policy text and thereafter the circular text. Only additional concepts and mentions were added to the extended ontology model of policy and circular. All direct references to Regulation and Circular were captured as concepts. This process resulted in a common navigable ontology from all the documents. Individual ontologies were also projected for each document as described earlier. Intersection of the models was performed to identify common concepts in all the documents. This suggests mapping between the documents. Similarly, uncommon concepts were also identified using set operations on the model. The above approach as implemented by the method of the present disclosure was effectively able to identify mappings for the documents in scope. With this method of the present disclosure, the system 100 was able to find 19 common concepts in the documents. Metrics for concept mod& creation for three documents is shown in Table 3 below.

TABLE 3

| Document | Page Count | Baseline Concepts | Refined Concepts | Updated Mentions | Time (min) |
| --- | --- | --- | --- | --- | --- |
| SAMA Cyber Security regulation | 56 | 44 | 72 | 53 | 139 |
| Access Control policy | 9 | 16 | 82 | 4 | 65 |
| RBI circular | 12 | 31 | 91 | 3 | 35 |

As is apparent from the above analysis, sequential processing of documents to extend the ontology resulted in fewer concepts being added with each new document.

Referring to steps of FIG. 3, at step 214 of the present disclosure, the one or more hardware processors 104 generate one or more citations and one or more statements from a natural language search query using an associated ontology footprint by using the common navigable ontology. The associated ontology footprint is obtained by identifying mentions of the one or more concepts in a search string. The above step of 214 is better understood by way of following description: Common navigable ontology obtained from the set of documents facilitates natural language search. A footprint of the search query text (also referred as natural language search query) is computed internally with the help of the common navigable ontology. This footprint is a projection of the common navigable ontology over the query. It can also be visualized as a subset of the common navigable ontology. The footprint of the natural language search query is scanned internally across all the regulations (or also referred as regulation documents and interchangeably used herein) in scope and relevant content is fetched by the system 100 automatically. Manual review on the fetched content may be done by the domain experts to ensure correctness of the fetched content.

The relevant content was fetched based on all elements present in the footprint. In simpler terms, the fetched content are the sentences where all the concepts are present i.e., intersection of all concepts. The system 100 and the method of FIG. 3 argue that the best matches are found where the complete footprint i.e., all the elements in footprint are present. Hence, by default, the system 100 initially fetches sentences with all the concepts. It is observed that the complete set of sentences that the domain expert may need to review with respect to the natural language search query are the ones where any of the concept is present. In simple words, the complete set of sentences to review are the ones where any of the concept is present i.e., union of concepts. This union set is the complete set of sentences related to the query but is a subset of complete regulatory text. Hence, this will reduce the burden of domain experts to review completely irrelevant sentences.

Regulatory text from regulation documents often contains some ambiguous terms. For example—In insurance domain, commission refers to monetary allowances for services rendered or products sold. For the same domain, commission also refers to organizations like Services Commission or Health and Human Services Commission. When the domain expert queries a text related to commission, they find instances for both forms of commission as monetary allowance and organization. In such a scenario, there is a need to eliminate certain phrases so that the domain experts can review a more precise and accurate content. Hence, the system 180 serves as an assistive tool for the domain experts in eliminating such sentences. In mathematical terms, it is a set difference of fetched sentences and sentence with phrase to eliminate. (Fetched content)=(Fetched content)−(Content with excluded phrase).

The associated ontology footprint contains all the concepts present in the natural language search query. This footprint may need to be modified in two cases: (a) the natural language search query can be a lot detailed containing some insignificant concepts, and (b) sentences in the regulatory text may not always contain all the concepts in query. Regulatory text contains implicit reference to general concepts.

The system 100 provide customizable options to the domain expert where they can modify this associated ontology footprint. This modification is in terms of removing the existing concept in the associated ontology footprint of natural language search query from the search. According to the changes made by the domain expert, the relevant content is fetched again by the system 100.

Regulatory text has references to both specific and general phrase. At times, the specific terms are referred by their general terms when it refers to all its type. The system 100 captures such notions in ontology as hierarchical elements with relation as "is". For example—"loss" is of two types "total loss" and "partial loss" in automobile insurance domain. Relations captured from this would be "total loss is loss" and "partial loss is loss", Hence, modifications in the associated ontology footprint are required to handle such scenarios. The system 100 serves as enabler or means to identify if the associated ontology footprint can be extended based on hierarchal concepts and concept attributes. The domain expert can choose to extend the footprint and extract a wider and complete content.

Along with the above modifications in the associated ontology footprint, the system 100 further provides an additional search mechanism which is slightly like modifying the associated ontology footprint itself. This involves searching multiple queries on top of one another. This is referred as a drill-down search. This is useful when the query is too general and additional domain expert knowledge is required to get precise results. It is similar to regular search with slight variation on the set where search is performed. The first search is done on the complete regulatory text, whereas the next searches are done on previous search result. The domain experts can perform any number of drill-down search. Search configuration like modifying the associated ontology footprint or switching between union/ intersection or exclusion is provided at each level of drill-down. Similar to drill-down, the domain expert can roll-up to previous search query results also to make new search in the previous results leading to different search path.

Referring to steps of FIG. 3, at step 216 of the present disclosure, the one or more hardware processors 104 determine hygiene in the plurality of enterprise documents with respect to a plurality of regulatory obligations based on the at least one of (i) the one or more similarities and the one or more gaps in the plurality of regulation documents and the plurality of enterprise documents, (ii) the plurality of matched statements and the plurality of gaps across the plurality of enterprise documents; and (iii) the one or more citations and the one or more statements. The expression 'Hygiene' in the present disclosure represents the state of consistency and completeness of enterprise documents with respect to regulatory obligations. It is to be understood by a person having ordinary skill in the art or person skilled in the art that enterprise documents and regulation documents are examples described for better understand of the system and method of the present disclosure and such examples shall not be construed as limiting the scope of the present disclosure. In other words, the system and method of the present disclosure may obtain documents other than enterprise documents and regulation documents for determining consistency and completeness therein (e.g., hygiene in regulatory compliance of documents). Examples of other documents may include but are not limited to, laws, statutes, standards (e.g., obtained from a standards body), blog text and other natural language text sources. Assuming that each obligation is covered by corresponding consistent statements—all similar, no gaps, no contrarian statements in enterprise documents then the overall consistency goal is achieved. If all the obligations are covered this way, then the completeness goal is achieved. Automated detection of similarity and gaps is nothing but a recommendation system (or the system 100) that brings out all the relevant content from the, often, huge text base of documents in consideration. There is a necessary human element involved for reviewing the recommendations, but this mechanism makes the review task easy.

With ever increasing regulation and a document centric, manual approach used in current practice enterprises often fail to be compliant. This results in stiff penalties and loss of brand value. Compliance solutions Ike Governance, Risk, and Compliance (GRC) frameworks leave much of the analysis and synthesis burden for correlating the content on the human experts. Embodiments of the present disclosure provide system and method for determining hygiene in the plurality of enterprise documents with respect to the plurality of regulatory obligations. More specifically, the method of the present disclosure bypasses the need to harmonize fully constructed ontologies post facto, instead incorporating the harmonization from the beginning, as part of the ontology extraction process, using an automated approach that takes inputs (e.g., domain expert review and inputs) only at necessary touchpoints. It extends a proven technology that enables extraction of a baseline ontology from one document to work with multiple domain specific documents and to create a common navigable ontology for all the input documents. The resulting ontology can assimilate new knowledge at each iteration, growing richer and more efficient as a lens to look at new inputs, therefore requiring less contribution from human reviewers.

Further, the system and method of the present disclosure help enterprises reach the desired state of hygiene in enterprise documents with respect to regulatory obligations wherein the method described herein effective in ontology extraction/creation from one regulatory document at a time.

The system and method of the present disclosure extend the notion to extract an ontology from multiple documents that are conceptually related, with the view that such an ontology would provide a formal basis for establishing correlations across documents. Moreover, the system and method of the present disclosure enable easy consumption of new knowledge in the form of incoming documents to further enrich the ontology while maintaining its integrity and improving in effort and time efficiency with each iteration.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent dements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the Ike, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed, Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
obtaining, via one or more hardware processors, a plurality of regulation documents, and a plurality of enterprise documents;
generating, via the one or more hardware processors, a baseline ontology further comprising a dictionary having one or more concepts as one or more nodes and one or more relations as one or more edges, wherein the baseline ontology is generated based on a first document that is randomly selected from the plurality of regulation documents or the plurality of enterprise documents, wherein the baseline ontology with the one or more concepts and the one or more relations between the one or more concepts is generated automatically, and wherein the baseline ontology is scanned and cleaned to remove redundant and unimportant one or more concepts, one or more mentions and one or more relations;
obtaining, via the one or more hardware processors, an extended ontology based on the baseline ontology;
creating, via the one or more hardware processors, a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents by extracting an ontology from one document to inspect text of other documents for assimilating new knowledge, wherein the common navigable ontology identifies a correlation between specific sentences from a regulation document and specific sentences in an enterprise document, wherein a navigation starts from concepts present in the specific sentences of the regulation document and traverses through a set of paths in a graph to end at concepts present in the sentences of the enterprise document, wherein the steps of generating the baseline ontology, the extended ontology and the common navigable ontology are repeated until the last document from the plurality of regulation documents or the plurality of enterprise documents is selected and processed for the extended ontology creation and the common navigable ontology, wherein the step of creating the common navigable ontology comprises:
  (i) merging one to one matched concepts comprised in the one or more subsequent baseline ontologies associated with one or more subsequent documents with the common navigable ontology;
  (ii) merging one or more unique concepts in the one or more subsequent baseline ontologies that do not match the one or more concepts comprised in the common navigable ontology;
  (iii) recommending for merging a concept from the one or more subsequent baseline ontologies that match to two to more concepts comprised in the common navigable ontology, wherein merging the concept is recommended to distribute one or more mentions in the one or more concepts comprised in the common navigable ontology; and
  (iv) merging one or more associated relations of a plurality of concepts comprised in the one or more subsequent baseline ontologies being merged with a plurality of corresponding concepts comprised in the common navigable ontology;

identifying, by using the common navigable ontology via the one or more hardware processors, one or more similarities and one or more gaps in the plurality of regulation documents and the plurality of enterprise documents, wherein identifying the one or more similarities and the one or more gaps in the plurality of regulation documents and the plurality of enterprise documents by capturing the one or more concepts of interest by an intersection of a set of concepts contained in ontologies for the documents comprised in the plurality of regulation documents and the plurality of enterprise documents, revealing conceptual commonality across the documents and the documents having the conceptual commonality are the documents of interest for establishing semantic correlations, wherein filters are applied selecting only the specific one or more concepts as being of interest for checking the semantic correlations, thereby reducing a search space in terms of the documents that need to be processed;

identifying, by using the common navigable ontology via the one or more hardware processors, a plurality of matched statements and a plurality of gaps across the plurality of enterprise documents;

generating one or more citations and one or more statements from a natural language search query using an associated ontology footprint by using the common navigable ontology, wherein the associated ontology footprint is obtained by identifying mentions of the one or more concepts in the natural language search query, wherein the associated ontology footprint is modified by a user via customizable options to remove existing concept in the associated ontology footprint of the natural language search query from a search, and wherein the associated ontology footprint is extended by the user based on hierarchical concepts and concept attributes upon identifying the associated ontology footprint to be extended;

determining hygiene in the plurality of enterprise documents with respect to a plurality of regulatory obligations based on the at least one of (i) the one or more similarities and the one or more gaps in the plurality of regulation documents and the plurality of enterprise documents, (ii) the plurality of matched statements and the plurality of gaps across the plurality of enterprise documents; and (iii) the one or more citations and the one or more statements;

displaying a visual representation of the common navigable ontology with a summarized text describing the paths through common and uncommon concepts which connect graphs, wherein the summarized text provides a conceptual understanding of texts of the regulation document and the enterprise document is related in a natural language text form to enable the user to identify the one or more gaps; and refining the baseline ontologies generated by a sequential ontology creation approach for the plurality of regulation documents or the plurality of enterprise documents via inputs from the user to capture relevant concepts using suitable automation aids.

2. The processor implemented method of claim 1, wherein the step of generating the baseline ontology comprises:
  extracting a plurality of sentences, a plurality of noun phrases, a plurality of Subject Verb Object (SVO) triplets, from the first document;
  extracting, a plurality of key-terms from the plurality of sentences from the first document, wherein a score is associated with each of the plurality of key-terms, and wherein the plurality of key-terms serves as a plurality of candidates for the one or more concepts;
  creating a dictionary based on the plurality of key-terms as the one or more concepts and the plurality of noun phrases ending with the plurality of key-terms as a corresponding mention of the one or more concepts;
  creating the one or more relations from the plurality of SVO triplets that contain one or more references to the one or more concepts; and
  creating the baseline ontology from the dictionary and the one or more relations.

3. The processor implemented method of claim 1, wherein a rank of a concept from the one or more concepts is determined based on a number of times the concept is cross-referenced.

4. The processor implemented method of claim 1, wherein the baseline ontology is modified to obtain the extended ontology by:
  creating a purpose specific ontology by filtering redundant and unimportant one or more concepts, one or more mentions and one or more relations from the baseline ontology;
  performing a SVO search for the one or more concepts and the one or more relations comprised in the baseline ontology to identify one or more new related concepts, one or more new associated mentions or relations;
  obtaining the extended ontology by adding at least one of the one or more new related concepts, and the one or more new associated mentions or relations in the baseline ontology.

5. The processor implemented method of claim 4, wherein the SVO search is initiated from a concept having a highest score.

6. The processor implemented method of claim 1, wherein each subsequent baseline ontology is modified to obtain an associated extended ontology based on a current common navigable ontology being generated.

7. A system, comprising:
  a memory storing instructions;
  one or more communication interfaces; and one or more hardware processors coupled to the memory via the one or more communication interfaces, wherein the one or ore hardware processors are configured by the instructions to:

obtain a plurality of regulation documents, and a plurality of enterprise documents;

generate a baseline ontology further comprising a dictionary having one or more concepts as one or more nodes and one or more relations as one or more edges, wherein the baseline ontology is generated based on a first document that is randomly selected from the plurality of regulation documents or the plurality of enterprise documents, wherein the baseline ontology with the one or more concepts and the one or more relations between the one or more concepts is generated automatically, and wherein the baseline ontology is scanned and cleaned to remove redundant and unimportant one or more concepts, one or more mentions and one or more relations;

obtain an extended ontology based on the baseline ontology;

create a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents by extracting an ontology from one document to inspect text of other documents for assimilating new knowledge, wherein the common navigable ontology identifies a correlation between specific sentences from a regulation document and specific sentences in an enterprise document, wherein a navigation starts from concepts present in the specific sentences of the regulation document and traverses through a set of paths in a graph to end at concepts present in the sentences of the enterprise document, wherein the steps of generating the baseline ontology, the extended ontology and the common navigable ontology are repeated until the last document from the plurality of regulation documents or the plurality of enterprise documents is selected and processed for the extended ontology creation and the common navigable ontology, wherein the common navigable ontology is created by:

merging one to one matched concepts comprised in the one or more subsequent baseline ontologies associated with one or more subsequent documents (OB) with the common navigable ontology;

(ii) merging one or more unique concepts in the one or more subsequent baseline ontologies that do not match the one or more concepts comprised in the common navigable ontology;

(iii) recommending for merging a concept from the one or more subsequent baseline ontologies that match to two to more concepts comprised in the common navigable ontology, wherein merging the concept is recommended to distribute one or more mentions in the one or more concepts comprised in the common navigable ontology; and (iv) merging one or more associated relations of a plurality of concepts comprised in the one or more subsequent baseline ontologies being merged with a plurality of corresponding concepts comprised in the common navigable ontology;

identify, by using the common navigable ontology, one or more similarities and one or more gaps in the plurality of regulation documents and the plurality of enterprise documents, wherein identifying the one or more similarities and the one or more gaps in the plurality of regulation documents and the plurality of enterprise documents by capturing the one or more concepts of interest by an intersection of a set of concepts contained in ontologies for the documents comprised in the plurality of regulation documents and the plurality of enterprise documents, revealing conceptual commonality across the documents and the documents having the conceptual commonality are the documents of interest for establishing semantic correlations, wherein filters are applied selecting only the specific one or more concepts as being of interest for checking the semantic correlations, thereby reducing a search space in terms of the documents that need to be processed;

identify, by using the common navigable ontology, a plurality of matched statements and a plurality of gaps across the plurality of enterprise documents;

generate one or more citations and one or more statements from a natural language search query using an associated ontology footprint by using the common navigable ontology, wherein the associated ontology footprint is obtained by identifying mentions of the one or more concepts in the natural language search query wherein the associated ontology footprint is modified by a user via customizable options to remove existing concept in the associated ontology footprint of the natural language search query from a search, and wherein the associated ontology footprint is extended by the user based on hierarchical concepts and concept attributes upon identifying the associated ontology footprint to be extended;

determine hygiene in the plurality of enterprise documents with respect to a plurality of regulatory obligations based on the at least one of (i) the one or more similarities and the one or more gaps in the plurality of regulation documents and the plurality of enterprise documents, (ii) the plurality of matched statements and the plurality of gaps across the plurality of enterprise documents; and (iii) the one or more citations and the one or more statements;

display a visual representation of the common navigable ontology with a summarized text describing the paths through common and uncommon concepts which connect graphs, wherein the summarized text provides a conceptual understanding of texts of the regulation document and the enterprise document are related in a natural language text form to enable the user to identify the one or more gaps; and refine the baseline ontologies generated by a sequential ontology creation approach for the plurality of regulation documents or the plurality of enterprise documents via inputs from the user to capture relevant concepts using suitable automation aids.

8. The system of claim 7, wherein the baseline ontology is generated by extracting a plurality of sentences, a plurality of noun phrases, a plurality of Subject Verb Object (SVO) triplets, from the first document;

extracting, a plurality of key-terms from the plurality of sentences from the first document, wherein a score is associated with each of the plurality of key-terms, and wherein the plurality of key-terms serves as a plurality of candidates for the one or more concepts;

creating a dictionary based on the plurality of key-terms as the one or more concepts and the plurality of noun phrases ending with the plurality of key-terms as a corresponding mention of the one or more concepts;

creating the one or more relations from the plurality of SVO triplets that contain one or more references to the one or more concepts; and creating the baseline ontology from the dictionary and the one or more relations.

9. The system of claim 7, wherein a rank of a concept from the one or more concepts is determined based on a number of times the concept is cross-referenced.

10. The system of claim 7, wherein the baseline ontology is modified to obtain the extended ontology by:

creating a purpose specific ontology by filtering redundant and unimportant one or more concepts, one or more mentions and one or more relations from the baseline ontology;

performing a SVO search for the one or more concepts and the one or more relations comprised in the baseline ontology to identify one or more new related concepts, one or more new associated mentions or relations;

obtaining the extended ontology by adding at least one of the one or more new related concepts, and the one or more new associated mentions or relations in the baseline ontology.

11. The system of claim 10, wherein the SVO search is initiated from a concept having a highest score.

12. The system of claim 7, wherein each subsequent baseline ontology is modified to obtain an associated extended ontology based on a current common navigable ontology being generated.

13. One or more non-transitory machine-readable information storage mediums comprising one or more instructions which when executed by one or more hardware processors cause:

obtaining, a plurality of regulation documents, and a plurality of enterprise documents;

generating a baseline ontology further comprising a dictionary having one or more concepts as one or more nodes and one or more relations as one or more edges, wherein the baseline ontology is generated based on a first document that is randomly selected from the plurality of regulation documents or the plurality of enterprise documents, wherein the baseline ontology with the one or more concepts and the one or more relations between the one or more concepts is generated automatically, and wherein the baseline ontology is scanned and cleaned to remove redundant and unimportant one or more concepts, one or more mentions and one or more relations;

obtaining an extended ontology based on the baseline ontology;

creating a common navigable ontology based on (i) the extended ontology associated with the first document and (ii) one or more subsequent baseline ontologies associated with one or more subsequent documents that are selected from remaining documents comprised in the at least one of the plurality of regulation documents and the plurality of enterprise documents by extracting an ontology from one document to inspect text of other documents for assimilating new knowledge, wherein the common navigable ontology identifies a correlation between specific sentences from a regulation document and specific sentences in an enterprise document, wherein a navigation starts from concepts present in the specific sentences of the regulation document and traverses through a set of paths in a graph to end at concepts present in the sentences of the enterprise document, wherein the steps of generating the baseline ontology, the extended ontology and the common navigable ontology are repeated until the last document from the plurality of regulation documents or the plurality of enterprise documents is selected and processed for the extended ontology creation and the common navigable ontology, wherein the step of creating the common navigable ontology comprises:

(v) merging one to one matched concepts comprised in the one or more subsequent baseline ontologies associated with one or more subsequent documents with the common navigable ontology;

(vi) merging one or more unique concepts in the one or more subsequent baseline ontologies that do not match the one or more concepts comprised in the common navigable ontology;

(vii) recommending for merging a concept from the one or more subsequent baseline ontologies that match to two to more concepts comprised in the common navigable ontology, wherein merging the concept is recommended to distribute one or more mentions in the one or more concepts comprised in the common navigable ontology; and (viii) merging one or more associated relations of a plurality of concepts comprised in the one or more subsequent baseline ontologies being merged with a plurality of corresponding concepts comprised in the common navigable ontology;

identifying, by using the common navigable ontology, one or more similarities and one or more gaps in the plurality of regulation documents and the plurality of enterprise documents, wherein identifying the one or more similarities and the one or more gaps in the plurality of regulation documents and the plurality of enterprise documents by capturing the one or more concepts of interest by an intersection of a set of concepts contained in ontologies for the documents comprised in the plurality of regulation documents and the plurality of enterprise documents, revealing conceptual commonality across the documents and the documents having the conceptual commonality are the documents of interest for establishing semantic correlations, wherein filters are applied selecting only the specific one or more concepts as being of interest for checking the semantic correlations, thereby reducing a search space in terms of the documents that need to be processed;

identifying, by using the common navigable ontology, a plurality of matched statements and a plurality of gaps across the plurality of enterprise documents;

generating one or more citations and one or more statements from a natural language search query using an associated ontology footprint by using the common navigable ontology, wherein the associated ontology footprint is obtained by identifying mentions of the one or more concepts in the natural language search query, wherein the associated ontology footprint is modified by a user via customizable options to remove existing concept in the associated ontology footprint of the natural language search query from a search, and wherein the associated ontology footprint is extended by the user based on hierarchical concepts and concept attributes upon identifying the associated ontology footprint to be extended;

determining hygiene in the plurality of enterprise documents with respect to a plurality of regulatory obligations based on the at least one of (i) the one or more similarities and the one or more gaps in the plurality of regulation documents and the plurality of enterprise documents, (ii) the plurality of matched statements and the plurality of gaps across the plurality of enterprise documents; and (iii) the one or more citations and the one or more statements;

displaying a visual representation of the common navigable ontology with a summarized text describing the paths through common and uncommon concepts which connect graphs, wherein the summarized text provides a conceptual understanding of texts of the regulation document and the enterprise document are related in a natural language text form to enable the user to identify the one or more gaps; and refining the baseline ontologies generated by a sequential ontology creation approach for the plurality of regulation documents or the plurality of enterprise documents via inputs from the user to capture relevant concepts using suitable automation aids.

14. The one or more non-transitory machine-readable information storage mediums of claim 13, wherein the step of generating the baseline ontology comprises:

extracting a plurality of sentences, a plurality of noun phrases, a plurality of Subject Verb Object (SVO) triplets, from the first document;

extracting, a plurality of key-terms from the plurality of sentences from the first document, wherein a score is associated with each of the plurality of key-terms, and wherein the plurality of key-terms serves as a plurality of candidates for the one or more concepts;

creating a dictionary based on the plurality of key-terms as the one or more concepts and the plurality of noun phrases ending with the plurality of key-terms as a corresponding mention of the one or more concepts;

creating the one or more relations from the plurality of SVO triplets that contain one or more references to the one or more concepts; and creating the baseline ontology from the dictionary and the one or more relations.

15. The one or more non-transitory machine-readable information storage mediums of claim 13, wherein a rank of a concept from the one or more concepts is determined based on a number of times the concept is cross-referenced.

16. The one or more non-transitory machine-readable information storage mediums of claim 13, wherein the baseline ontology is modified to obtain the extended ontology by:

creating a purpose specific ontology by filtering redundant and unimportant one or more concepts, one or more mentions and one or more relations from the baseline ontology;

performing a SVO search for the one or more concepts and the one or more relations comprised in the baseline ontology to identify one or more new related concepts, one or more new associated mentions or relations;

obtaining the extended ontology by adding at least one of the one or more new related concepts, and the one or more new associated mentions or relations in the baseline ontology.

17. The one or more non-transitory machine-readable information storage mediums of claim 16, wherein the SVO search is initiated from a concept having a highest score.

18. The one or more non-transitory machine-readable information storage mediums of claim 13, wherein each subsequent baseline ontology is modified to obtain an associated extended ontology based on a current common navigable ontology being generated.

19. The processor implemented method of claim 1, wherein the recommendations are one or more of the following in a preferred sequence: (i) merging a mention with a concept in the extended ontology with a maximum S-Bert similarity score, (ii) merging a mention with a hierarchal concept, either new or existing, parent or child, and (iii) creating a new concept, wherein the baseline ontology enables visual aids to perform a cross check on the text for full coverage in the baseline ontology and incorporating missing concepts or mentions by the user upon visual scanning of highlighted concepts in the text, and wherein the associated ontology footprint is further modified by providing a drill-down search mechanism for searching a plurality of queries on top of one another or a roll-up search mechanism to roll up to previous search query results to provide a new search in the previous search query results leading to a different search path.

20. The processor implemented method of claim 1, wherein the filters include (i) when $(R \cap C \cap P)! = \phi$, providing a set of documents to be processed to establish semantic correlations, wherein R refers to the set of concepts in the plurality of regulation documents, C refers to the set of concepts in circular, and P refers to the set of concepts in the plurality of enterprise documents, (ii) when n $(R \cap C \cap P)$ is high, identify and prioritize the documents exhibiting a high chance of the conceptual commonality, and (iii) when concept $C \epsilon R \cap C \cap P$ and the concept C is relevant to a conceptual mapping requirement, identify the documents impacted by a single obligation that is changed in a new version of the regulation, to reduce the search space.

* * * * *